US00RE38767E

(19) United States
(12) Reissued Patent
Wedell et al.

(10) Patent Number: US RE38,767 E
(45) Date of Reissued Patent: Aug. 2, 2005

(54) ROADWAY LUMINAIRE

(75) Inventors: Mark Taylor Wedell, Wrightsville Beach, NC (US); Edward Bernard Bilson, Germantown, TN (US); Thomas A. Zimmerman, Southaven, MS (US); Glenn A. Ellis, III, Memphis, TN (US); Rick W. Kauffman, Memphis, TN (US)

(73) Assignee: Acuity Brands, Inc., Atlanta, GA (US)

(21) Appl. No.: 10/621,198

(22) Filed: Jul. 16, 2003

Related U.S. Patent Documents

Reissue of:
(64) Patent No.: 5,803,590
Issued: Sep. 8, 1998
Appl. No.: 08/610,575
Filed: Mar. 8, 1996

(51) Int. Cl.[7] ..... F21S 1/10
(52) U.S. Cl. ..... 362/226; 362/370; 362/371; 362/431; 362/263; 362/396
(58) Field of Search ..... 362/368, 370, 362/371, 414, 431, 263, 226, 265, 430, 276, 802, 418, 287, 432

(56) References Cited

U.S. PATENT DOCUMENTS

| | | | | |
|---|---|---|---|---|
| 3,018,081 | A | * | 1/1962 | Waldbauer |
| 3,023,394 | A | * | 2/1962 | Hubbell |
| 3,071,683 | A | * | 1/1963 | Queale |
| 3,094,220 | A | * | 6/1963 | Harling |
| 3,120,985 | A | * | 2/1964 | Hubbell |
| 3,142,501 | A | * | 7/1964 | Clark et al. |
| 3,146,054 | A | * | 8/1964 | Sheamer et al. |
| 3,177,462 | A | * | 4/1965 | Sarnmark |
| 3,184,199 | A | * | 5/1965 | Clark et al. |
| 3,201,271 | A | | 8/1965 | Simmons, Jr. et al. |
| 3,297,864 | A | * | 1/1967 | Waldbauer |
| 3,387,866 | A | * | 6/1968 | Baldwin |
| 3,432,629 | A | * | 3/1969 | Field et al. |
| 3,433,941 | A | | 3/1969 | Hall |
| 3,530,287 | A | * | 9/1970 | Husby |

(Continued)

FOREIGN PATENT DOCUMENTS

| | | |
|---|---|---|
| CH | 973165 | 10/1964 |
| DE | 1142963 | 1/1963 |
| DE | 1489490 | 4/1969 |
| DE | 2215888 | 3/1972 |
| DE | 3539389 | 5/1987 |
| DE | 9015538 | 3/1991 |
| DE | 94111264 | 7/1992 |
| EP | 0059892 | 9/1982 |
| EP | 0370825 | 5/1990 |
| FR | 938008 | 9/1948 |

(Continued)

OTHER PUBLICATIONS

Product Brochure on Hubbell Lighting's Intelligent Ignitor System dated Sep. 1999.

*Primary Examiner*—Thomas M. Sember
(74) *Attorney, Agent, or Firm*—Kilpatrick Stockton, LLP

(57) ABSTRACT

A roadway luminaire is provided which includes a mast mount docking station securable to an end of a pole mast. The mast mount docking station includes a power plug electrically coupled to the power conductors. The luminaire includes a corresponding power plug which is electrically and mechanically coupled to the mast mount docking station via a twist-lock feature including mating keys and keyways in the docking station and luminaire, respectively. The luminaire includes several plug-in components such as a plug-in photoelectric cell, a plug-in starter and a capacitor press-fit into a molded cavity in the luminaire. The power plug of the luminaire is adaptable to be used with all international voltages. The twist-lock feature provides for a fool-proof mechanical and electrical connection to ensure that the correctly rated luminaire is connected to the supply voltage.

12 Claims, 10 Drawing Sheets

U.S. PATENT DOCUMENTS

| | | | | |
|---|---|---|---|---|
| 3,562,509 | A | * | 2/1971 | Kahl, Jr. |
| 3,562,510 | A | | 2/1971 | Baldwin |
| 3,614,711 | A | * | 10/1971 | Anderson et al. |
| 3,777,136 | A | * | 12/1973 | Okuda |
| 3,949,211 | A | | 4/1976 | Elms |
| 3,950,639 | A | | 4/1976 | Van Steenhoven |
| 4,029,955 | A | | 6/1977 | Tart |
| 4,059,753 | A | | 11/1977 | Tart et al. |
| 4,096,555 | A | | 6/1978 | Lasker |
| 4,143,413 | A | * | 3/1979 | Kelly |
| 4,152,757 | A | * | 5/1979 | Bilson et al. |
| 4,167,033 | A | * | 9/1979 | Fletcher |
| 4,200,901 | A | | 4/1980 | Shaffer et al. |
| 4,229,064 | A | * | 10/1980 | Vetter et al. |
| 4,255,781 | A | | 3/1981 | Plemmons et al. |
| 4,320,443 | A | * | 3/1982 | Zwillich |
| 4,345,306 | A | * | 8/1982 | Summey |
| 4,360,863 | A | * | 11/1982 | Barnes et al. |
| 4,378,584 | A | * | 3/1983 | Russello |
| 4,379,321 | A | * | 4/1983 | Plemmons et al. |
| 4,384,316 | A | * | 5/1983 | de Vos et al. |
| 4,388,680 | A | * | 6/1983 | Moore |
| 4,392,192 | A | * | 7/1983 | Steadman |
| 4,426,676 | A | * | 1/1984 | Taylor |
| 4,433,367 | A | * | 2/1984 | Shelby et al. |
| 4,434,456 | A | | 2/1984 | Taylor |
| 4,449,168 | A | * | 5/1984 | Ewing |
| 4,472,768 | A | | 9/1984 | Quiogue |
| 4,473,873 | A | * | 9/1984 | Quiogue |
| 4,500,946 | A | * | 2/1985 | Mikola |
| 4,509,106 | A | | 4/1985 | Mayer et al. |
| 4,538,217 | A | * | 8/1985 | Ewing et al. |
| 4,551,793 | A | * | 11/1985 | Mellema |
| 4,559,587 | A | | 12/1985 | Quiogue et al. |
| 4,617,619 | A | | 10/1986 | Gehly |
| 4,639,843 | A | * | 1/1987 | Compton |
| 4,736,999 | A | * | 4/1988 | Marks et al. |
| 4,772,226 | A | * | 9/1988 | Schlesinger |
| 4,791,539 | A | * | 12/1988 | Ewing |
| 4,793,581 | A | * | 12/1988 | Bilson et al. |
| 4,796,001 | A | * | 1/1989 | Gostyla |
| 4,819,133 | A | * | 4/1989 | Kochi et al. |
| 4,882,667 | A | | 11/1989 | Skegin |
| 4,905,133 | A | | 2/1990 | Mayer et al. |
| 4,907,139 | A | * | 3/1990 | Quiogue |
| 4,907,142 | A | | 3/1990 | Burkarth |
| 4,937,718 | A | * | 6/1990 | Murray |
| 4,956,756 | A | * | 9/1990 | Hsiao |
| 4,994,948 | A | | 2/1991 | Cooch |
| 4,996,636 | A | * | 2/1991 | Lovett |
| 5,010,458 | A | | 4/1991 | Fraizer |
| 5,134,554 | A | * | 7/1992 | Donato et al. |
| 5,136,493 | A | * | 8/1992 | Straus et al. |
| 5,141,325 | A | | 8/1992 | Huang |
| 5,192,129 | A | | 3/1993 | Figueroa |
| 5,243,508 | A | * | 9/1993 | Ewing et al. |
| 5,249,112 | A | * | 9/1993 | Bray |
| 5,266,738 | A | * | 11/1993 | MacVoy |
| 5,287,259 | A | | 2/1994 | Lautzenheiser |
| 5,313,379 | A | | 5/1994 | Lemons et al. |
| 5,351,174 | A | * | 9/1994 | Ewing |
| 5,395,246 | A | * | 3/1995 | Punako et al. |
| 5,450,302 | A | | 9/1995 | Maase et al. |
| 5,481,445 | A | | 1/1996 | Sitzema et al. |
| 5,535,109 | A | | 7/1996 | Moore et al. |
| 5,535,110 | A | | 7/1996 | Ling |
| 5,544,030 | A | | 8/1996 | Wijbenga |
| 5,581,448 | A | | 12/1996 | Harwood |
| 5,651,612 | A | | 7/1997 | Braun |
| 5,690,422 | A | | 11/1997 | Brass |
| 5,803,590 | A | | 9/1998 | Wedell et al. |
| 5,806,957 | A | | 9/1998 | Prior et al. |
| 5,838,109 | A | | 11/1998 | Kobayashi et al. |
| 5,918,970 | A | | 7/1999 | Brohard et al. |
| 5,941,632 | A | | 8/1999 | Wedell et al. |
| 6,059,427 | A | | 5/2000 | Wedell et al. |
| 6,127,782 | A | | 10/2000 | Flory, IV et al. |
| 6,132,065 | A | | 10/2000 | Wedell et al. |
| 6,241,367 | B1 | | 6/2001 | Wedell et al. |
| 6,302,564 | B1 | | 10/2001 | Wedell et al. |
| 6,419,378 | B1 | | 7/2002 | Wedell et al. |

FOREIGN PATENT DOCUMENTS

| | | |
|---|---|---|
| FR | 2495279 | 6/1982 |
| GB | 862292 | 3/1961 |
| JP | 6106854 | 4/1986 |
| JP | 6111605 | 4/1994 |
| JP | 6203616 | 7/1994 |

* cited by examiner

ROADWAY LUMINAIRE

Matter enclosed in heavy brackets [ ] appears in the original patent but forms no part of this reissue specification; matter printed in italics indicates the additions made by reissue.

FIELD OF INVENTION

The present invention relates generally to luminaires for outdoor lighting and more particularly relates to a roadway luminaire which is easy to mount to a mast arm and easy to maintain due to a mounting arm assembly, a twist-lock feature, a fool-proof power plug and a plug-in replacement luminaire.

BACKGROUND OF THE INVENTION

Poles for supporting luminaires for the illumination of roadways, parking lots and the like differ not only in that they have either a vertical end with a mast arm or an inclined end, but also in that the diameters of the poles vary. For example, some poles have approximately a horizontal end, the end often being at an angle of 5° to about 15° to the horizontal. This variety of pole constructions results in that luminaires are commonly manufactured and warehoused in a corresponding variety of constructions. Accordingly, it would be advantageous to have a universal mounting device for mounting a luminaire to a pole or mast arm.

Additionally, current maintenance costs associated with roadway luminaires is extremely high. Particularly, maintenance is usually performed by licensed electricians to replace capacitors, ballasts, photoelectric controls, starters and complete luminaires. The average cost to replace/install a luminaire is approximately three times the cost of the luminaire itself, e.g. the cost of three men, two trucks and a trailer. There have been efforts in the past to overcome some of the maintenance problems associated with roadway illumination. For example, U.S. Pat. No. 4,937,718 discloses a roadway luminaire having the electrical components employed in the lamp ballasting circuitry mounted to a door member by means of a universal mounting bracket having a deformable planer construction. In this way, a variety of different sized components can be mounted using the disclosed bracket. Additionally, U.S. Pat. No. 4,538,217 discloses a flood light luminaire having all the electrical components mounted on a removable door casting to allow for servicing and maintenance. U.S. Pat. No. 4,791,539 discloses a luminaire having quick-disconnect components which one mounted on an electrical plate detachably secured to a support plate of the luminaire. The plate includes a quick disconnect for detaching the electrical plate from the support plate. However, maintenance of the luminaire is still costly and replacement of components of the ballasting circuitry is difficult and time consuming.

Another disadvantage of known roadway luminaires includes the possibility of replacing a luminaire with one of a different voltage. Currently, roadway lighting may be operated at voltages of 120, 208, 220, 230, 240, 277, 347 and 480 volts throughout the world. Accordingly, it is quite possible when replacing or repairing luminaires to use replacement parts rated for a different voltage. Thus, it would be advantageous to provide a luminaire which includes a means for keying the luminaire so that it can only be replaced by a luminaire which operates at the same voltage.

Yet another disadvantage of known roadway luminaires is the "hot wiring" of the luminaire, thus making replacement difficult and dangerous. In most cases, rather than shutting off the power to the roadway lighting, the lighting is repaired with power being supplied to the luminaire. Accordingly, only licensed electricians with proper protective gear generally perform replacements of luminaires. Thus it would be advantageous to have a luminaire which can be safely and easily replaced even with power being supplied to the luminaire.

In view of the present disadvantages of currently available roadway lighting devices, it is desirable to redesign the luminaire to be easy to install and maintain, provide a fool-proof replacement system which permits only luminaires of same voltage to replace a damaged luminaire and to make installation and maintenance most cost effective.

SUMMARY OF THE INVENTION

It is an object of the present invention to allow safe and easy installation and maintenance of roadway luminaires.

It is a further object of the present invention to provide an improved mounting system for a luminaire to a mast arm.

It is yet a further object of the present invention to provide a keyed power plug receptacle for connecting the luminaire to the power supply.

It is yet another object of the present invention to provide a luminaire which can be mounted to a mast arm assembly utilizing a simple twist-lock feature.

It is still a further object of the present invention to provide a luminaire having a plug-in starter module located externally on the luminaire housing for ease of replacement.

It is yet a further object of the present invention to provide a luminaire including an internal leveling device for proper positioning of the luminaire.

In accordance with the present invention, a luminaire for mounting on a pole, and more specifically, a roadway luminaire includes a mast mount docking station having a clamp for attaching to the pole at one end of the docking station and a keyed coupling means provided at an opposite end of the docking station and the luminaire having a connecting plate provided with keyways such that the luminaire is removably coupled to the mast mount docking station by a twist-lock mating between the keys and keyways of the coupling means and connector plate. The mast mount docking station further includes an electrical plug connector located at the coupling end of the docking station and, the luminaire includes a mating electrical plug connector for electrically connecting the mast mount docking station to the luminaire. Specifically, the supply voltage is coupled to the electrical plug connector in the mast mount docking station and the mating electrical plug connector in the luminaire provides the supply voltage to the ballast circuitry and ultimately the lamp.

For ease of attachment of the mast mount docking station to the pole, the docking station includes a plurality of knock-outs for adapting to mast diameters of varying sizes. In this way, the mast mount docking station can be specifically adapted such that little space is left between the mast and the docking station to prevent animals and the like from entering the docking station. The docking station more specifically includes an upper mast assembly and a lower mast assembly. The upper mast assembly includes the clamp for attaching the docking station to the pole. The upper and lower mast assemblies are secured together by bolts such that the electrical plug connector mentioned above is secured therebetween. Additionally, the docking station may include a series of inclined steps located in the upper mast assembly to permit angles of tilt for leveling the luminaire.

With respect to the twist-lock feature, the luminaire may be coupled to the mast mount docking station by a 15° to about 30° rotational movement of the luminaire with respect to the docking station. This rotational movement provides both electrical and mechanical connection. More specifically, upon rotation, the power plugs of the mast mounting docking station and luminaire, respectively, are electrically connected and the keys of the docking station are mechanically connected to the connector plate of the luminaire in the same motion. The luminaire also preferably includes a molded photoelectric control receptacle extending above a top portion of the luminaire and a molded capacitor compartment which extends below a bottom portion of the luminaire to provide hand holds for performing the twist-lock mounting of the luminaire to the docking station.

With respect to the electrical connectors, each of the connectors is provided with a series of crenulations, each crenulation being identified with a specific voltage rating to cover the spectrum of all available international voltages. The twist-lock feature for mating the connectors is provided with keyways which ensure that only corresponding voltage rated connectors are operatively coupled together.

The roadway luminaire of the present invention also includes a lower housing in which the ballast circuitry is mounted to a surface thereof such that the starter receptacle opens externally to an assembled upper and lower housing assembly and the starter module includes a plug-in connector to electrically couple the starter to the receptacle without the use of tools. Likewise, the upper housing is provided with a photoelectric control cell receptacle integrally molded to a top surface thereof. The luminaire includes a plug-in photoelectric cell which can be selectively inserted into the receptacle and replaceable without the use of tools. Lastly, the lower housing includes a cavity for receiving a capacitor of the ballast circuitry. The capacitor is press-fit into the cavity for insertion and/or removal without the use of tools. Accordingly, maintenance of the luminaire is simple and fast.

Also disclosed is a method of installing or removing a roadway luminaire, the luminaire including a mast mount docking station for attachment to a pole mast. The luminaire and docking station having mating twist-lock connectors, the method comprising the step of twisting the luminaire with respect to the docking station to thereby mechanically couple and/or release the mating twist-lock connectors. The method is further defined such that the luminaire and mast mount docking station include mating power plug connectors and wherein the step of twisting the luminaire also electrically connects and/or disconnects the mating power plug connectors.

Lastly, a method of manufacturing a housing for a luminaire is disclosed. Specifically, the method includes the steps of molding a composite to form the housing including a dome section surrounding an area of the lamp; coating an inner surface of the dome section with urethane; vacuum metalizing the inner surface of the dome section with aluminum; and coating the inner surface of the dome section with acrylic to form a reflective surface.

A preferred form of the luminaire, as well as other embodiments, objects, features and advantages of this invention, will be apparent from the following detailed description of illustrative embodiments thereof which is to be read in connection with the accompanying drawings.

DETAILED DESCRIPTION OF THE PREFERRED EMBODIMENTS

Figure 1:
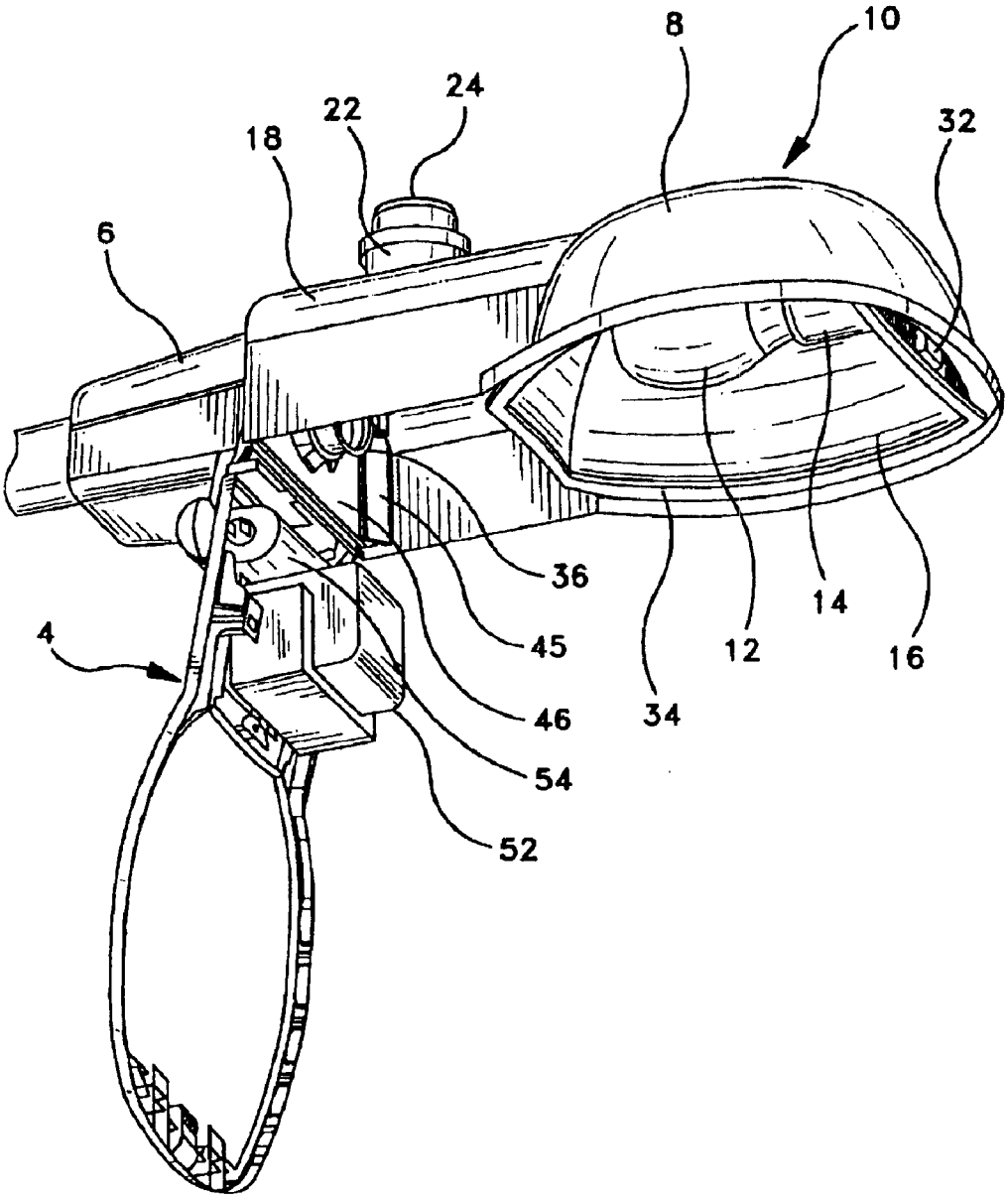
FIG. 1 is a perspective view of the luminaire assembly including the mast mounting assembly with the lower door of the luminaire in an open position formed in accordance with the present invention.

FIG. 1 illustrates a roadway illumination luminaire 10 which includes an upper housing 2, a lower housing 4 and a mast mounting docking station 6. The upper housing 2 includes two sections. The first section is the dome section 8 which includes a lamp 12, lamp socket 14 and a reflective inner surface 16. The second section is the protective housing 18 for the electronic circuitry and electrical components of the luminaire.

Preferably, the upper housing 2 is formed of long-life, weather and corrosion resistant fiber reinforced polymer construction. Known luminaires usually include separate reflectors that are typically stamped of aluminum and are supported in the dome portion of the luminaire housing. In the present invention, the reflector 16 is integrated into the upper housing 2. More specifically, the upper housing is preferably a compression molded composite with the reflective surface geometry 51 being formed during the molding process.

The preferred embodiments of the upper housing 2 and reflective surface include either a natural housing finish or a simulated metal finish. In a preferred embodiment of the upper housing 2, the interior reflective surface 16 is base coated with a urethane, then vacuum metalized with aluminum and top coated with an acrylic. Thus, a reflective surface is provided on the interior of the dome portion only and all other surfaces are unfinished. Furthermore, the upper housing may be pigmented grey during the molding process to achieve to simulated metal finish discussed above.

The upper housing 2 also includes a photoelectric control cell socket for receiving a plug-in photoelectric controller 24. The photoelectric control cell socket is integrally formed during the molding process in a top section of the upper housing to provide for an unobstructed line-of-sight for the photoelectric control cell 24. The socket is preferably a standard three terminal, polarized, locking-type socket.

As shown in FIG. 1, the luminaire also includes a lower housing or door assembly 4 which is removably coupled the upper housing 2 via hooks 26 (FIG. 2) and detents 28 of the lower housing 4 which allows the lower housing or door to circuitry of the luminaire. A common failure mode among luminaires using the circuitry of the present invention is starter failure. In known luminaires, the starter is generally bolted to the inside of the luminaire requiring the luminaire to be disassembled to replace the starter. In order to make maintenance of the luminaire of the present invention simple and fast, the starter 63 plugs into the starter receptacle 61 from outside the luminaire housing. The starter 63 includes male terminals 65, preferably three ¼" faston terminals, which are received in the mating female starter receptacle 61. In order to further protect the starter 63 from the elements, the starter 63 is positioned within a molded starter case 67. The starter case and receptacle 61 preferably also include a snap-lock feature to ensure good mating contact between the male terminals on the starter 63 and female receptacle. The snap-lock feature is achieved by molding snap-locks into the lower housing during manufacture and molding corresponding mating connectors 69 onto the starter case 67. In the preferred embodiment of FIG. 2, the starter 63, located within the starter case 67, extends downward from the bottom of the lower housing 4 when the lower housing is in a closed position with respect to the upper housing 2. Accordingly, the starter 63 is protected by the luminaire from direct contact with the elements, yet is easily and readily accessible for maintenance purposes. Additionally, no tools are necessary when changing the starter due to the snap-lock feature which eliminates any hardware. Advantageously, the starter may be potted to reduce the occurrence of temperature and vibration failure.

The ballast circuitry in the lower housing 4 is electrically connected to the upper housing 2, i.e. the lamp socket via a multiple pin connector (not shown). Most known luminaires have the ballast circuitry mounted in the upper housing whereas the present invention mounts all the components of the ballast circuit in the lower housing. This design allows for easy maintenance when the lower housing is swung open. Furthermore, the entire lower housing assembly may be replaced simply by unplugging the multiple pin connector and lifting the lower housing off the upper housing hooks 26. Alternatively, the type of luminaire can be changed by replacing the lower housing with one having a different ballast circuit. Accordingly, the maintenance procedure for the luminaire of the present invention is greatly simplified. To repair a failed luminaire, the maintenance worker would check the lamp, the photoelectric control cell and the starter. If none of these appear to be the problem, the entire lower housing can be replaced. Alternatively, the entire luminaire can be replaced by twisting the luminaire 10 off the mast mount docking station 6 and twisting on a new one. The twist-lock feature of the present invention will be described in greater detail below.

Figure 3:
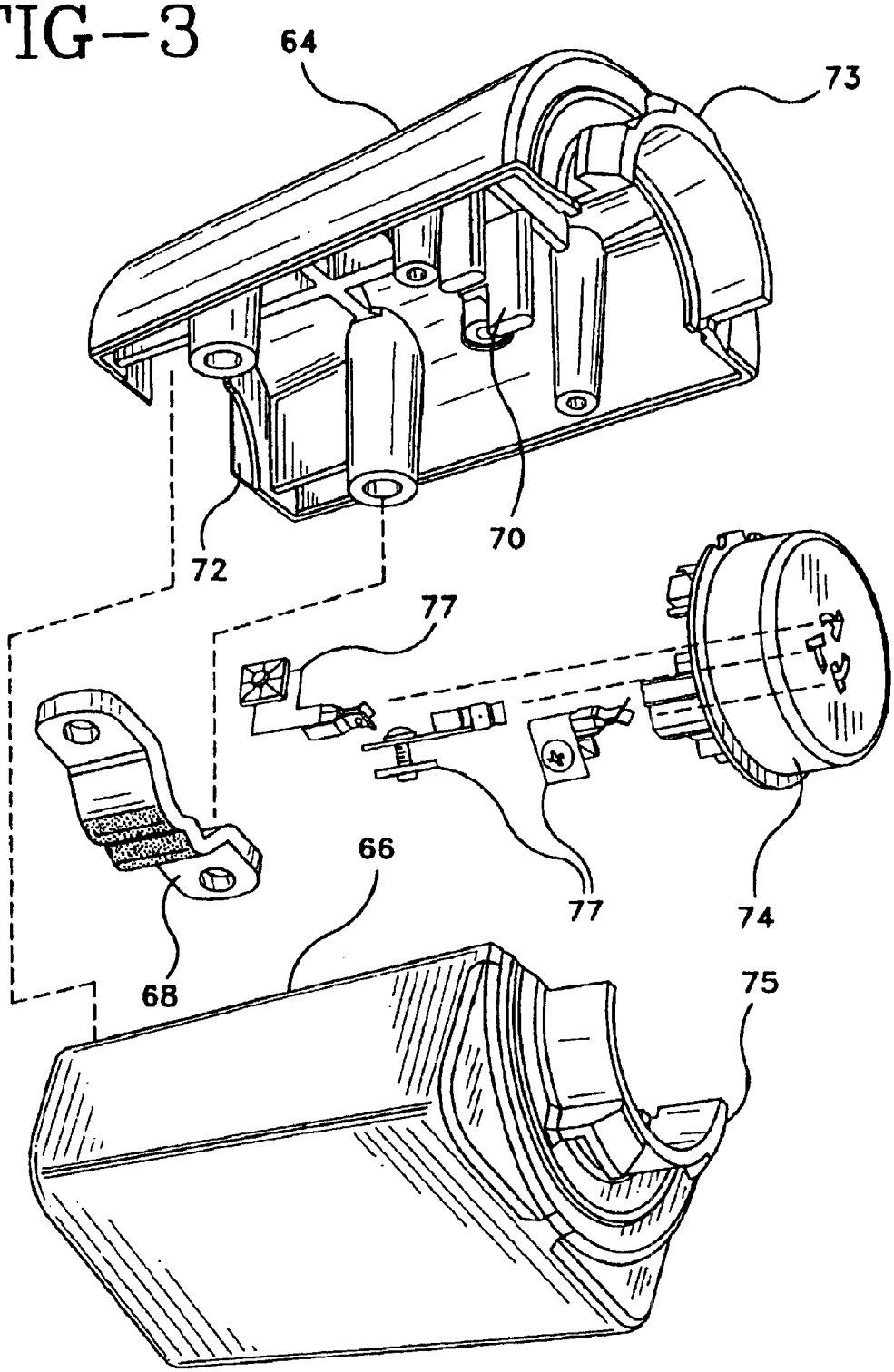
FIG. 3 is an exploded perspective view of the mast mounting assembly including the female power plug of the luminaire formed in accordance with the present invention.

FIG. 3 illustrates an exploded view of the mast mount docking station 6 formed in accordance with the present invention. The mast mount docking station 6 includes an upper mast assembly 64 and a lower mast assembly 66. The mast mount docking station is preferably formed of precision die cast aluminum. The upper mast assembly 64 is secured to the pole mast by a clamp 68 which is attached to the upper mast assembly by a pair of bolts (not shown). The mast mount docking station 6 is capable of receiving 1¼" through 2" pipe without rearrangement of the clamp or bolts. The upper mast assembly 64 also includes a series of inclined steps 70 for receiving the end of the pole mast. The inclined steps are provided to allow angles of tilt for leveling the luminaire 10 with respect to a horizontal plane to produce maximum light to the surface below.

Furthermore, the upper and lower mast assemblies 64, 66 are provided at one end with a thin wall section 72 which may be removed, similar to a "knock-out" in a junction box, thereby allowing the mast mount docking station to receive mast arms of different dimensions and to provide a relatively close fit therewith to prevent animals from entering the mast mount docking station. The upper and lower mast assemblies are provided at the opposite end with a keyed connector 73, 75 for mating connection with the twist-lock plate 46 shown in FIGS. 1 and 2.

Figure 2:
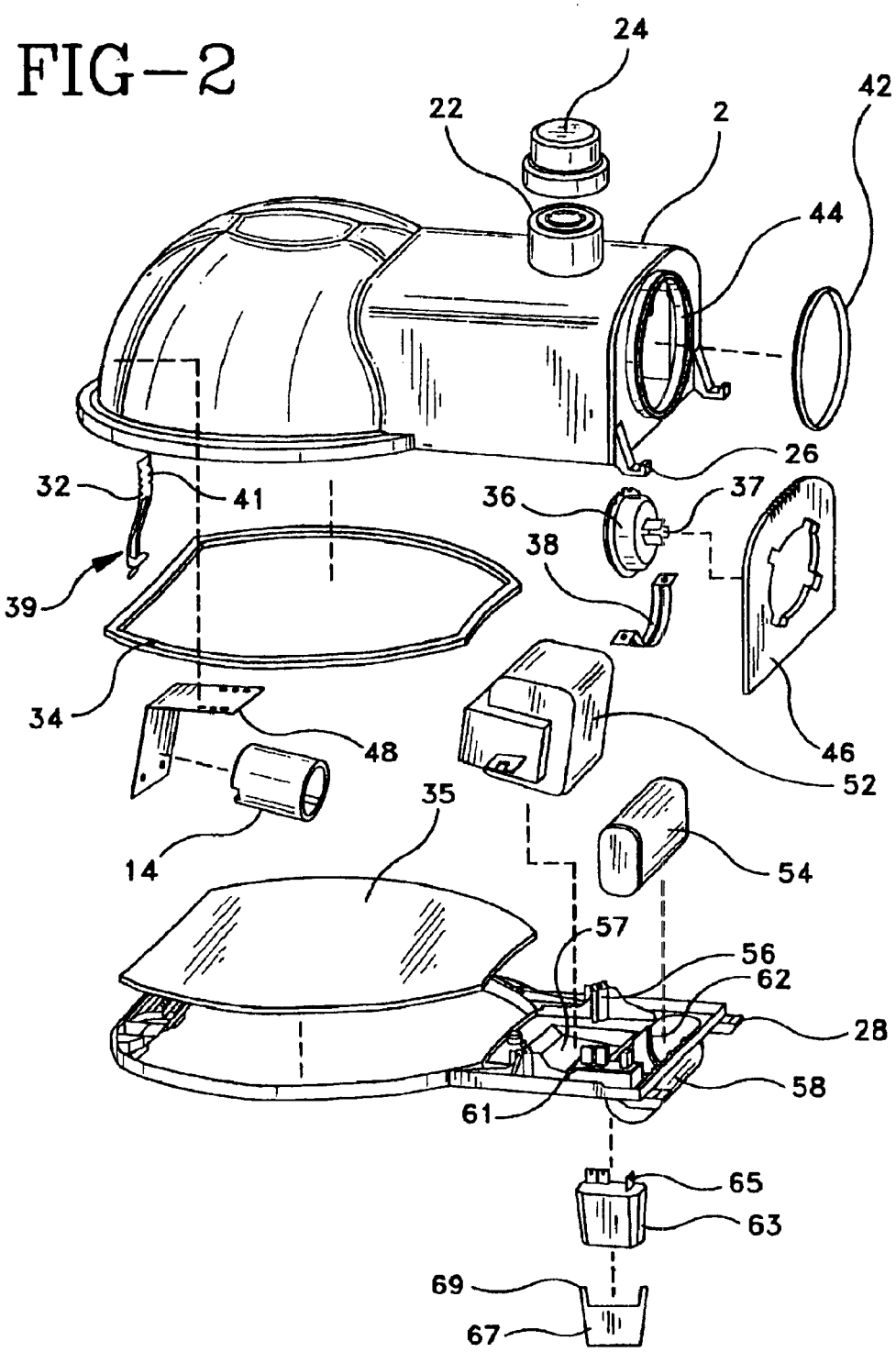
FIG. 2 is an exploded perspective view of the luminaire assembly formed in accordance with the present invention.
Figure 4:
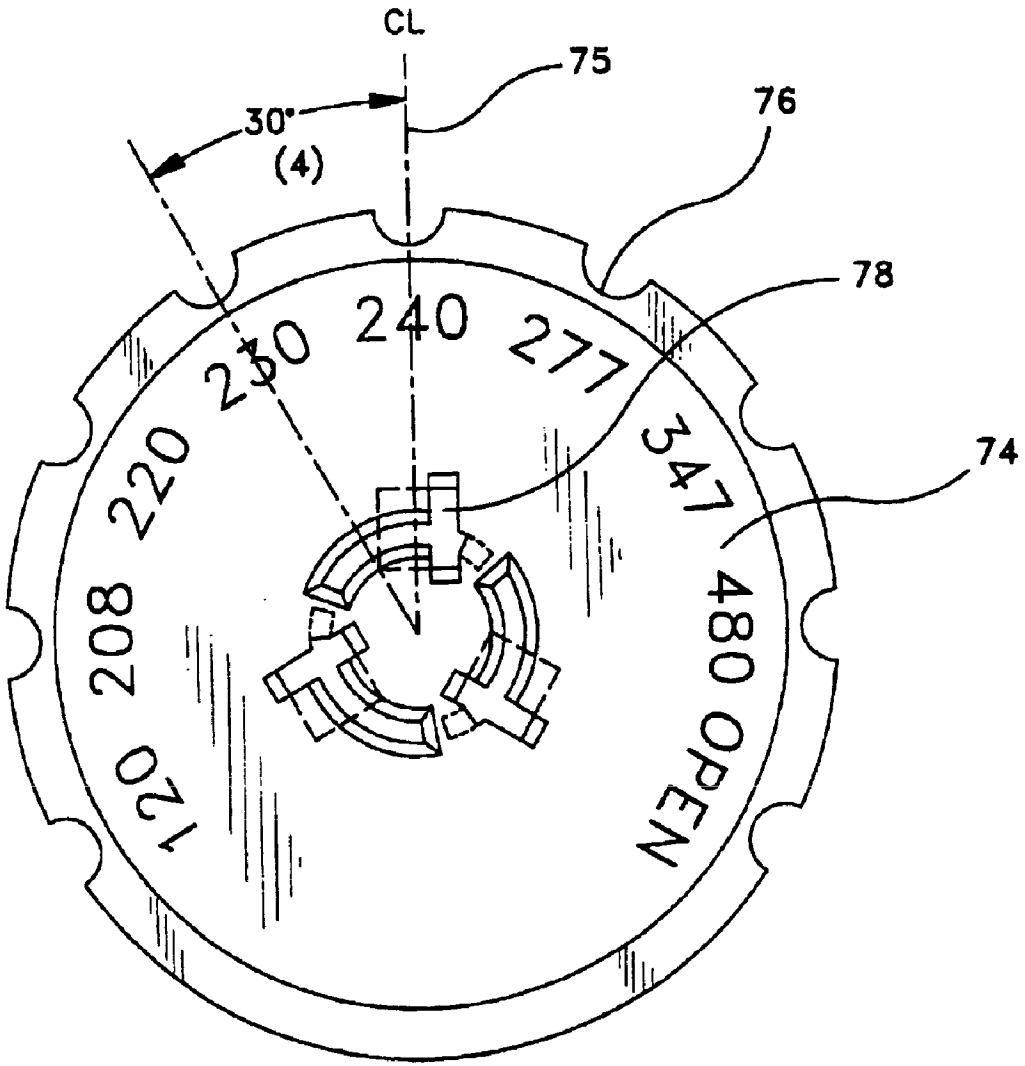
FIG. 4 is an end view of the female power plug formed in accordance with the present invention.
Figure 5:
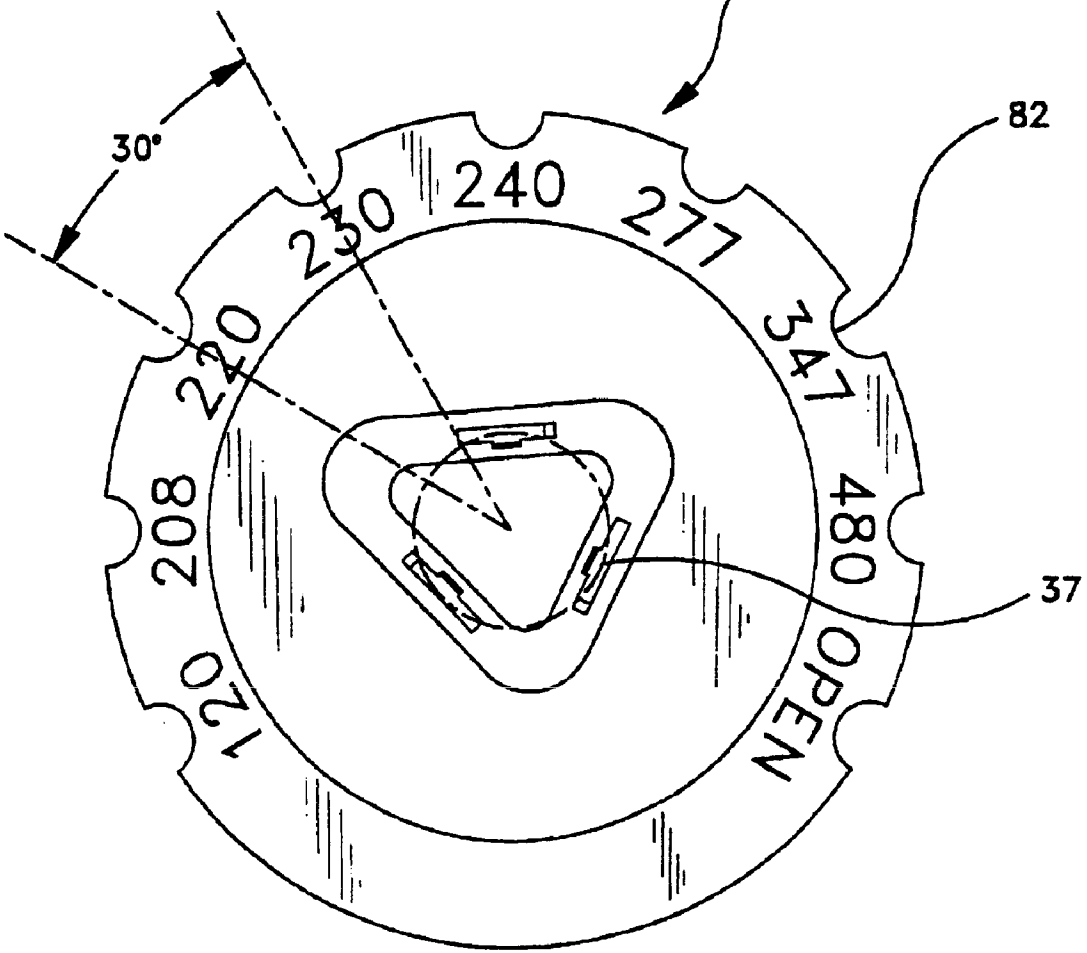
FIG. 5 is an end view of the male power plug formed in accordance with the present invention.

FIG. 3 also illustrates a power plug connector 74 for receiving the electrical power conductors to operate the luminaire. The power plug connector 74 is a female connector and includes three snap-in receptacle terminals which receive the power conductors and are secured thereto by a screw on the side of the terminal. FIG. 4 is an end view of the female power plug connector 74. The plug serves as a receptacle for the male plug connector 36 of the luminaire (FIGS. 1 and 2). The outer circumferential edge of the female power plug is provided with a series of crenulations 76, each identified with a different voltage rating. The plug is designed so that the intended voltage rating of the power supply is oriented in a vertical position (along center line 75) to thereby identify the proper voltage for the particular luminaire to be coupled thereto. The female receptacle includes three receiving slots 78 which are generally circular in shape and have a radially extending portion of the slot for receiving the terminals of the corresponding male plug positioned in the luminaire. The male plug 36, shown in FIG. 5, includes a corresponding set of crenulations 82 and voltages associated with each. Thus, it will be readily apparent that the luminaire is for a specific voltage supply and will be connected only to a corresponding voltage female plug connector.

The twist-lock feature of the present invention is provided by the interface between the mast mount docking station 6 and the luminaire 10, such that the male and female plugs 37, 74, respectively, are electrically connected upon the mechanical connection of the luminaire 10 to the mast mount docking station 6. Preferably, the twist-lock is accomplished by a rotational movement of the luminaire with respect to the mast mount docking station ranging from about 15° to about 30°. The twist-lock feature provides both electrical connection between the male and female plugs as well as mechanical connection of the luminaire to the mast mount docking station. Furthermore, the twist-lock feature provides for fool-proof voltage matching between the power source and the luminaire attached thereto. Specifically, the key/keyways of the mast mount docking station and locking plate of the luminaire are designed so that only corresponding voltage male and female plugs may be electrically connected. Additionally, mechanical stops are provided at the key/keyway interface for providing a stop against over mechanical rotation.

Accordingly, the luminaire of the present invention is simple to install due to the two piece design, i.e., the mast mount docking station 6 and the luminaire fixture 10, which are electrically and mechanically connected via a twist-lock feature. Also, once the mast mount docking station is installed, repair and/or replacement of the luminaire is simplified and can be done "hot" since the power is connected to the luminaire by means of the mating power plugs. Furthermore, general maintenance of the luminaire has also been simplified by eliminating all unnecessary hardware, e.g. providing a plug-in photoelectric control cell, a plug-in starter, and a lower housing door latch which requires no tools to open. Additionally, the design of the lower housing which includes the ballast circuitry can easily be electrically disconnected form the upper housing by unplugging a swing open exposing the inner portion of the upper housing and an inner surface of the lower housing. The lower housing 4 includes mounted thereon the ballast circuitry to electrically power the luminaire. The lower housing is capable of swinging to a closed position enclosing the luminaire and is held closed via a latch 32. Preferably, the latch 32 can be released without the use of tools to open the luminaire for repair and maintenance.

Also shown in FIG. 1 is a lock-plate 46 which is fitted into the upper housing at its mounting end. More specifically, in a first embodiment, the lock-plate 46 is held by a pair of triangular-shaped bosses 45 attached to the side walls of the upper housing to provide a slot between the bosses 45 and a rear wall 47 of the upper housing 2. The lock-plate 46 is then slidingly fitted in the receiving slot of the upper housing. The lock-plate 46 includes a central opening and a series of keyways associated with the central opening for receiving the mast mount docking station herein. The inter-relationship of the lock-plate with the mast mount docking station will be described later in greater detail.

Figure 6A:
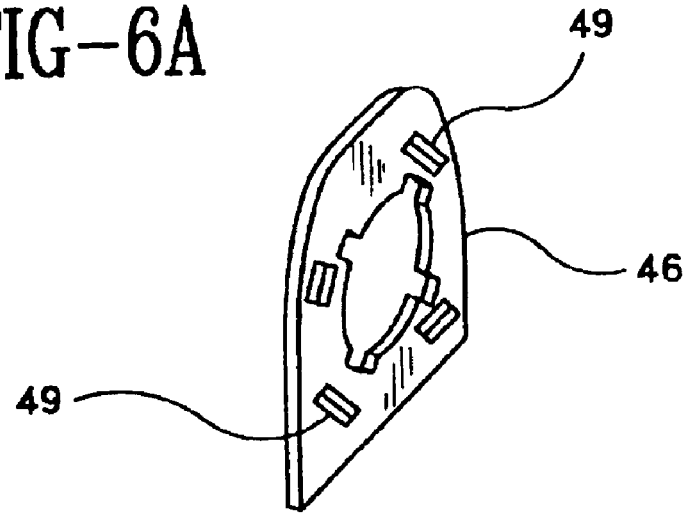
FIG. 6A is a perspective view of an alternative lock-plate.
Figure 6B:
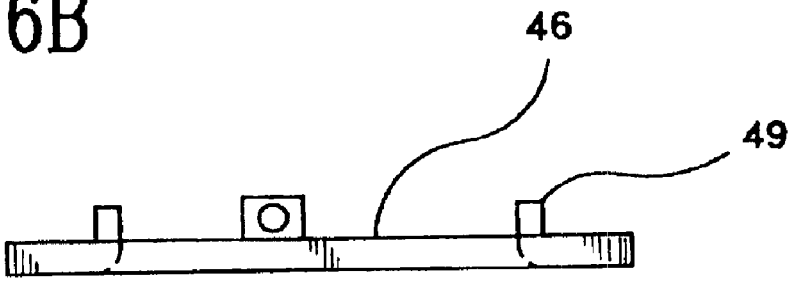
FIG. 6B is a side view of the lock-plate of FIG. 6A.
Figure 8:
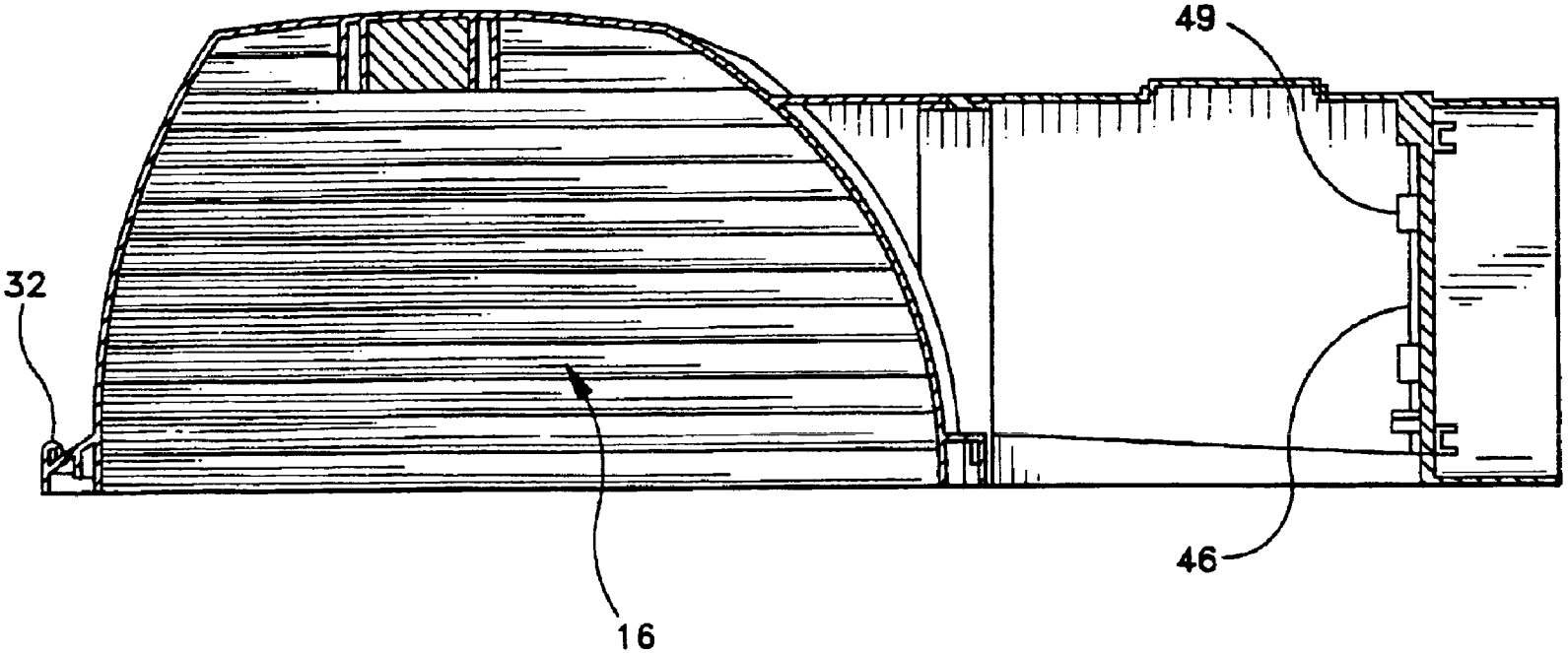
FIG. 8 is a longitudinal cross-sectional view of the upper housing.

In a second embodiment, the lock-plate 46, as shown in FIGS. 6A, 6B and 8, includes a series of tabs 49 extending perpendicular to a surface of the lock-plate for mating connection with a power plug 36. In this embodiment, the lock-plate 46 is adhesively bonded to the upper housing at its mounting end. The lock-plate 46 of the second embodiment similarly includes a central opening and a series of keyways associated therewith, the function of which is the same as the first embodiment, i.e., receiving the mast mount docking station.

Referring to FIG. 2, the luminaire 10 is illustrated in an exploded view showing each of the components in the luminaire. Specifically, FIG. 2 illustrates the upper housing 2 having the integrally formed photoelectric control cell socket and hooks 26 for engagement with the detents 28 of the lower housing 4. The upper housing 2 also includes a flange 35 surrounding the dome section in which an adhesive-backed felt or Dacron-polyester gasket 34 can be fitted. The gasket 34 provides a "breathing seal" gasketing between the lens 35 of the lower housing 4 and the lamp compartment 8 of the upper housing 4 to allow superior filtration.

Figure 7:
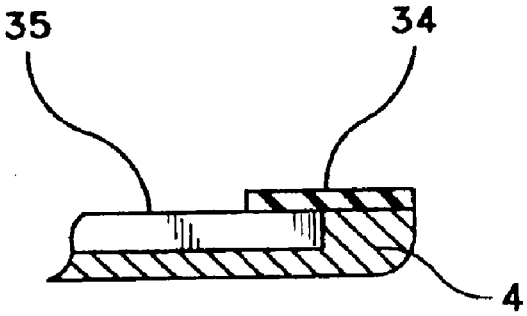
FIG. 7 is a partial cross-sectional view of the lower housing wherein the lens is trapped under the gasket.

In an alternate embodiment, the gasket 34 is fitted to the lower housing as illustrated in FIG. 7. Specifically, the gasket 34 is positioned such that the lens and the edge portion of the lower housing are trapped beneath the gasket.

The upper housing 2 also provides a mounting surface for a power plug 36. In the embodiment shown in FIG. 2, the power plug 36 is a male plug which is held in position within the upper housing by means of a u-shaped clamp 38. Alternatively, the power plug includes a series of tabs which matingly connect with the series of tabs provided on the lock-plate 46 illustrated in FIG. 6. Thus, the clamp 38 can be omitted reducing the number of parts and enhancing the maintainability of the luminaire. The power plug 36 provides a connection means from the line voltage to the luminaire ballast circuitry. The terminals 37 of the male power plug 36 are keyed, the purpose of which will be described later in greater detail.

The upper housing 2 is further provided at its plug connection end with a groove for receiving an o-ring seal 42. The groove is designed to include interference flanges 44 so that the o-ring 42 can be fixedly press-fit into the housing without the use of a bonding agent. The o-ring seal 42 provides for a water-tight seal between the luminaire and the mast mount docking station 6. The functional relationship of the locking plate 46 and the mast mount docking station 6 will be described later in greater detail.

As previously discussed, the lower housing 4 is maintained in a closed position with respect to the upper housing by means of a latch 32. As shown in FIG. 2, the latch comprises a latching device 39 at one end and lances 41 at the opposite end. The lances of the latch allow the latch to be lockingly engaged into a corresponding integrally molded receptacle (not shown) in the upper housing, thereby eliminating the need for additional hardware to mount the latch.

Figure 9A:
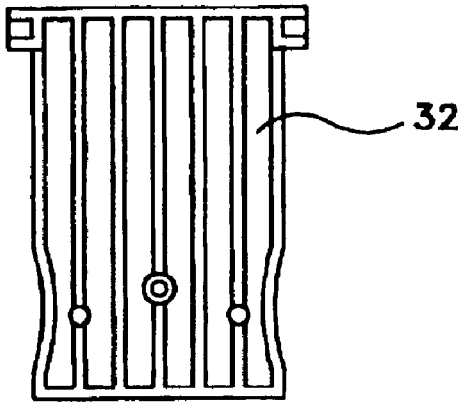
FIG. 9A is a front view of a toggle-type latch.
Figure 9B:
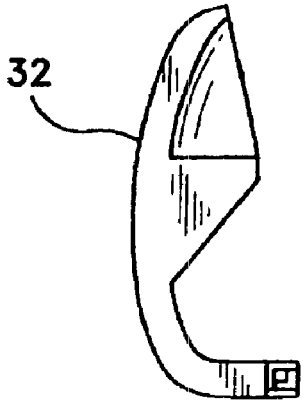
FIG. 9B is a side view of the latch of FIG. 9A.

Alternatively, the latch 32 may be an external toggle-type latch, similar to latches commonly used on a lunch box. Such a latch is illustrated in FIGS. 9A and 9B. The latch connection boss of the upper housing is illustrated in FIG. 8. Accordingly, no tools would be required to open the housing assembly to access the lamp or ballast circuitry. The toggle-type latch provides for a positive locking means closing the upper and lower housing interface while being simple to manufacture and operate.

Figure 12:
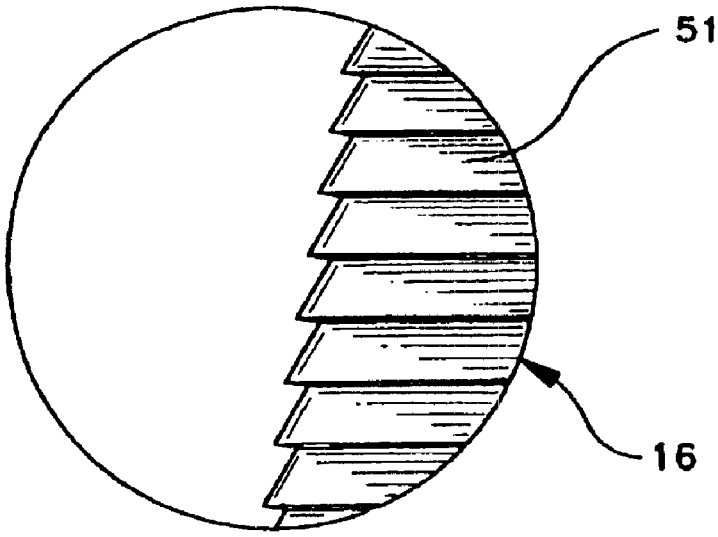
FIG. 12 is an exploded view of section B of FIG. 11.
Figure 10:
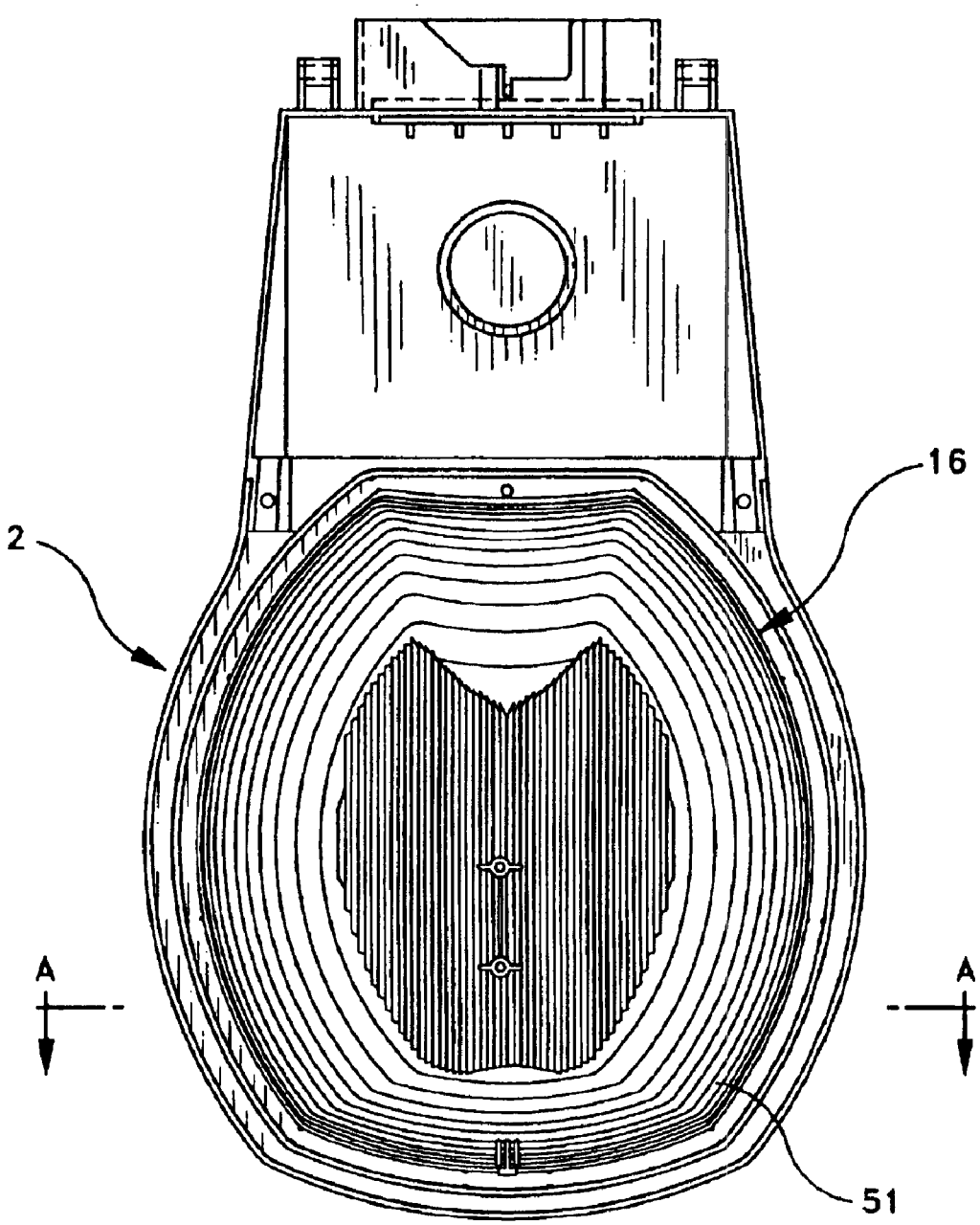
FIG. 10 is a bottom view of the upper housing illustrating the geometry of the reflective surface.
Figure 11:
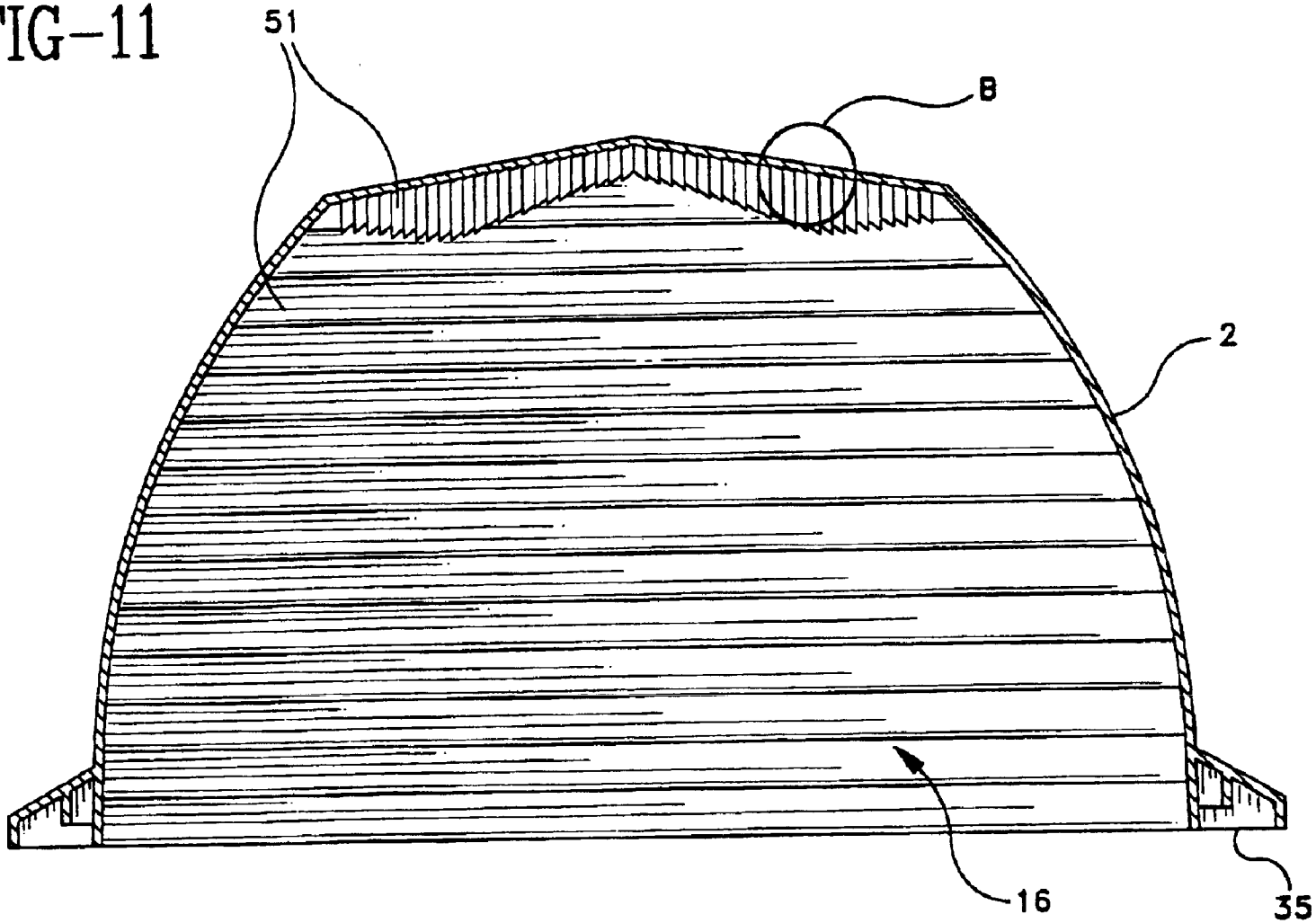
FIG. 11 is a cross-sectional view of the upper housing taken along lines A—A of FIG. 10.

FIG. 2 also illustrates that the lamp socket 14 is connected to the upper housing 2 via a socket bracket 18. The electrical wiring from the socket to the ballast circuitry is trapped between the upper housing flange 35 and the gasket 34 thereby protecting the wiring within the luminaire. Alternatively, when the gasket 34 is positioned on the lower housing as previously described, the upper housing flange 35 preferably includes interference ribs therein such that the socket wiring is wedged between the ribs and the flange walls thereby holding them securely in place. The lamp socket 14 is preferably positioned at approximately a 15° degree angle with respect to a horizontal plane taken through the center-line of the upper housing 2. The angled socket in combination with the geometric design 51 of the luminaire reflective surface produces enhanced photometric performance. More specifically, the luminaire has true horizontal cutoff performance in photometrics. The geometric design of the reflector 51, as illustrated in FIGS. 10, 11 and 12, is designed to have more uniform light distribution over a wider area. The geometric design includes a series of substantially triangular-shaped sections to reflect the light in a downward direction producing a wide distribution of light to the ground. Additionally, unlike known luminaires which include globe-style lenses, the lens 35 of the present invention is flat, providing a sleek appearance to the luminaire, as well as reducing the surface area exposed to the wind. However, a globe lens may also be used with the same advantageous results.

The lower housing 4 as shown in FIG. 2 includes molded recesses 57, 58 therein for receiving components of the ballast circuitry, namely a ballast 52 and a capacitor 54. The ballast 52 is fixedly attached to the lower housing by means of bolts which are received in bosses 56 extending upwardly from a base of the lower housing 4. The recess or cavity 58 for receiving the capacitor is dimensioned so that the capacitor is press-fit into the cavity thereby eliminating the need for any hardware. The capacitor cavity may include molded ribs 62 which deflect to permit insertion and withdrawal of the capacitor, yet provide a fit snug enough to hold the capacitor in place. The ballast 52 and capacitor 54 are closely fitted in the lower housing and, accordingly, the lower housing preferably includes a heat shield (not shown) between the ballast and the capacitor. The heat shield allows for reduced internal distances thereby reducing the size and cost of the fixture.

The lower housing 4 further includes a starter receptacle 61 integrated therein. The starter 63 is part of the ballast connector and being lifted off the hooks of the upper housing for simple replacement. In the alternative, the entire luminaire can be quickly and easily replaced simply by twisting off the old luminaire and twisting on a new one. The luminaire of the present invention also provides power plugs capable of being adapted to all presently available international voltages and a fool-proof keying system to allow only corresponding voltage luminaires to be coupled to the mast mount docking station.

Various changes to the foregoing described and shown structures would now be evident to those skilled in the art. Accordingly, the particularly disclosed scope of the invention is set forth in the following claims.

What is claimed is:

1. A luminaire for mounting to a pole which comprises:

a mast mount docking station including a clamp for attaching to the pole at one end of the docking station and a keyed coupling means at an opposite end of the docking station;

an electrical plug connector disposed in the coupling means end of the docking station;

a luminaire including a mating electrical plug connector for electrically connecting the mast mount docking station to the luminaire, the luminaire further including a connection end having keyways therein such that the luminaire is removably mechanically and electrically coupled to the mast mount docking station by a twist-lock mating between the mating electrical plug connectors and keyed coupling means of the mast mount docking station and the keyways in the connection end of the luminaire.

2. A luminaire as defined by claim 1, wherein the mast mount docking station comprises an upper mast assembly and a lower mast assembly, one of the upper mast assembly and lower mast assembly including the clamp for attaching the docking station to the pole, the upper mast assembly being removably secured to the lower mast assembly to thereby secure the electrical plug connector therein.

3. A luminaire as defined by claim 1, wherein the mast mount docking station includes a series of inclined steps at the mast mounting end to allow angles of tilt for leveling the luminaire.

4. A luminaire as defined by claim 1, wherein the luminaire is twist-lock coupled to the mast mount docking station by about a 15° to about a 30° rotational movement of the luminaire with respect to the docking station.

5. A luminaire as defined by claim 1, wherein the electrical connector of the docking station receives power conductors which exit the pole, the electrical connector being provided with a series of crenulations, such that each crenulation is identified with a different voltage rating to accommodate all international voltages.

6. A luminaire for mounting to a pole, comprising:

a mast mount docking station having a pole connection end including means for attaching the docking station to the pole and a coupling means at an opposite end of the docking station; and a luminaire including a connection end having mating coupling means with the docking station coupling means such that the luminaire is removably coupled to the mast mount docking station by a twist-lock mating between the respective coupling means; wherein the pole connection end of the mast mount docking station includes an opening for receiving the pole having a plurality of removable knock-outs therearound for enlarging the opening to accommodate mast diameters of varying sizes.

7. A luminaire for mounting to a pole, comprising:

a mast mount docking station having a pole connection end including a means for attaching the docking station to the pole and a coupling means at an opposite end of the docking station; and a luminaire including a connection end having mating coupling means with the docking station coupling means such that the luminaire is removably coupled to the docking station by a twist-lock mating therebetween, wherein the luminaire further includes a molded photoelectric control receptacle extending above a top portion of the luminaire and a molded electronics compartment extending below a bottom portion of the luminaire to provide hand holds to perform the twist-lock mounting of the luminaire to the docking station.

8. A method of installing or removing a roadway luminaire, the luminaire including a mast mount docking station for attachment to a pole mast, the luminaire and docking station including mating twist-lock connectors, the luminaire and mast mount docking station further including mating power plug connectors, the method comprising the step of:

twisting the luminaire with respect to the docking station to thereby mechanically and electrically connect and/or disconnect the mating twist-lock connectors and the mating power plug connectors.

9. A method as defined by claim 8, wherein the step of twisting the luminaire is accomplished in less than a quarter-turn.

10. A roadway luminaire comprising:

a mast mount docking station having a pole connection end including means for attaching the docking station to the pole and a coupling means at an opposite end thereof;

a first plug connector having fixed contacts coupled to a power supply, the first plug connector being positioned at the coupling means end of the docking station;

a lamp assembly including a housing having a mating connection end and a central cavity enclosing an illumination lamp electrically connected to ballast circuitry, the mating connection end further including a second plug connector having fixed contacts electrically coupled to the ballast circuitry, wherein upon twist-locking the mating connection end of the lamp assembly housing to the docking station, the lamp assembly is removably mechanically coupled and the fixed contacts of the first plug connector interengage with the fixed contacts of the second plug connector to provide power to the illuminating lamp.

11. A roadway luminaire as defined in claim 10, wherein the fixed contacts of one of the first and second plug connectors are blade-type contacts which are received in mating blade receiving socket contacts.

12. A roadway luminaire as defined in claim 10, wherein the docking station attaching means is a slip-fitter clamp.

* * * * *